May 10, 1932.  M. POPPLETON  1,857,568
INCUBATOR TRAY
Filed May 18, 1928
Fig.1.
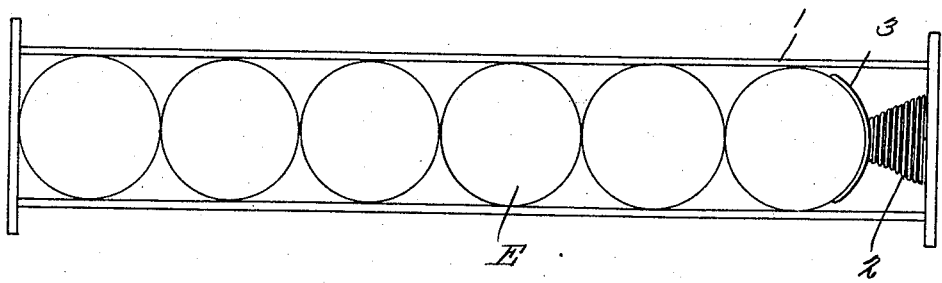
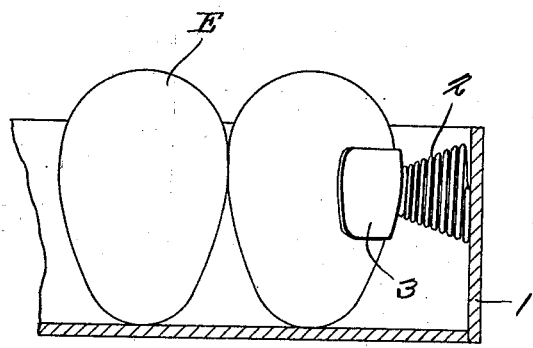
Fig.2.
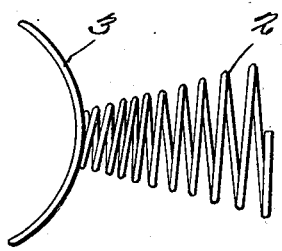
Fig.3.
Mae Poppleton
Inventor
By C.A.Snow&Co.
Attorneys.

Patented May 10, 1932

1,857,568

UNITED STATES PATENT OFFICE

MAE POPPLETON, OF GREENVILLE, ILLINOIS

INCUBATOR TRAY

Application filed May 18, 1928. Serial No. 278,763.

This invention relates to incubator trays and more particularly to a means for supporting eggs in upstanding positions on their small ends so that a series of eggs can be held securely in turning trays and the like without the necessity of utilizing paper or other like material such as commonly employed.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a plan view of a tray showing a row of eggs held therein by a device such as constitutes the present invention.

Figure 2 is an enlarged vertical longitudinal section through one end portion of the tray, the parts therein being shown in elevation.

Figure 3 is a detail view of the attachment used in the tray.

Referring to the figures by characters of reference 1 designates a turning tray to one end wall of which is secured the large end or base of a conical coiled spring 2 the other end of which is attached to the center of an arcuate plate 3 constituting the head of the attachment. The eggs E are adapted to be placed in a row in the tray so as to rest with their small ends lower most. The row of eggs is crowded between one end of the tray and the plate 3, it being understood that the spring 2 is compressed so as to exert a constant pressure through the plate against the eggs. Thus all of the eggs will be held together firmly perpendicularly on their small ends with the result that hatching will be greatly facilitated.

Spring 2 can be attached to the end of the tray or can be separate therefrom. If it is separate, as shown in the drawings, it can be adjusted to any desired position on the wall of the tray so as to exert a pressure against the row of eggs along the proper line. In other words the attachment can be properly placed for use with eggs of different sizes.

What is claimed is:

The combination with a tray open at the top and having fixed side walls spaced apart to engage opposed portions of a row of eggs to hold them against lateral tilting, said eggs being insertible downwardly into the tray onto the bottom thereof, means separate from the tray and insertible between one end wall thereof and one end egg of a row for pressing the eggs of the row against each other and the other end egg of the row against one end wall of the tray, said means including a conically coiled spring the large end of which constitutes a base for engaging the end wall of the tray, and an arcuate member connected to the small end of the spring for embracing the adjacent egg in line with the points of contact between the eggs.

In testimony that I claim the foregoing as my own, I have hereto affixed my signature.

MAE POPPLETON.